United States Patent [19]

Joy

[11] 4,429,534
[45] Feb. 7, 1984

[54] METHANOL FUELED SPARK IGNITION ENGINE

[75] Inventor: John R. Joy, Brighton, Mich.

[73] Assignee: Williams International Corporation, Walled Lake, Mich.

[21] Appl. No.: 401,823

[22] Filed: Jul. 26, 1982

[51] Int. Cl.³ ............................................. F01K 23/14
[52] U.S. Cl. ........................................ 60/618; 60/624; 123/3
[58] Field of Search ...................... 123/3; 60/597, 614, 60/618, 620, 624

[56] References Cited

U.S. PATENT DOCUMENTS 3,963,000 6/1976 Kosaka et al. ......................... 123/3
4,244,188 1/1981 Joy ......................................... 123/3

Primary Examiner—William A. Cuchlinski, Jr.
Attorney, Agent, or Firm—Lyman R. Lyon

[57] ABSTRACT

The disclosure relates to a spark ignition engine that is fueled by methanol. Liquid methanol is first heated in a heat exchanger and then vaporized in a vapor generator. The vapor is decomposed in a catalytic reactor and expanded in an expander having an output shaft coupled to the output shaft of said spark ignition engine. A carburetor on said engine mixes air and the expanded decomposed methanol vapor to fuel said spark ignition engine.

1 Claim, 2 Drawing Figures

METHANOL FUELED SPARK IGNITION ENGINE

BACKGROUND OF THE INVENTION

1. Field of the Invention

The invention relates to a methanol fueled internal combustion engine as well as to a method of operation of said engine that results in relatively low emissions yet evidences a relatively high thermal efficiency.

2. Description of the Prior Art

It is known to feed methanol and water, or methanol and steam, to a reformer having a catalytic bed. The reformer uses exhaust heat from an internal combustion engine to produce gases which, in turn, fuel the internal combustion engine. It is also known to feed methanol to a catalytic decomposition chamber to produce gases to fuel an internal combustion engine. It is also known to use reformers to form fuel cell input gases from methanol.

SUMMARY OF THE INVENTION

Liquid methanol is delivered by a fuel pump to a charge cooler where it is partially heated by decomposed methanol gases being delivered to an internal combustion engine. The methanol liquid is vaporized by a vapor generator which receives heat from the exhaust gases of the internal combustion engine. The vaporized methanol is delivered to a catalytic reactor where it is further heated and decomposed by the action of the catalyst and heat from the exhaust gases. The mixture is fed to an expander, which helps drive the output shaft of an internal combustion engine. The exhaust gases from the expander are mixed with air and combusted within the internal combustion engine.

DETAILED DESCRIPTION OF THE PREFERRED EMBODIMENT OF THE INVENTION

Figure 1:
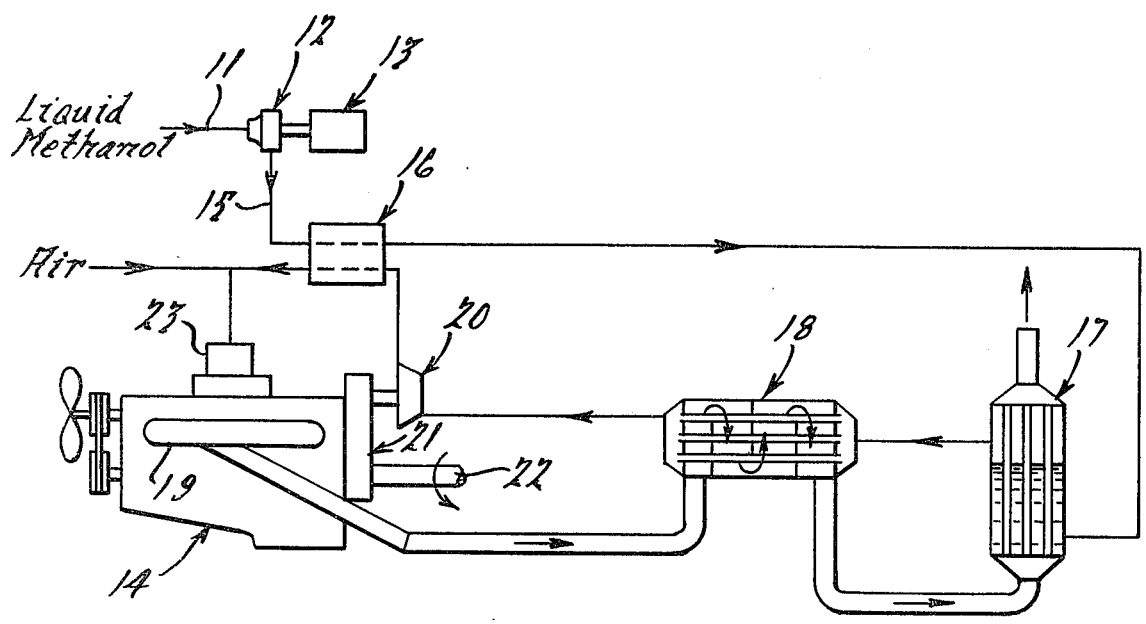
FIG. 1 is a schematic view of a methanol fueled engine system in accordance with one embodiment of the invention.

Referring to FIG. 1 of the drawings, a methanol supply line 11 conducts liquid methanol to a fuel pump 12. The fuel pump 12 may be driven by a separate electric motor 13 or may be directly driven by the internal combustion engine generally indicated at 14. In a preferred embodiment, the methanol flowrate is, for example, 0.25 lbs/second of $CH_3OH$ at 77° F. The power necessary to drive the fuel pump 13 is relatively small, for example, 0.8 horsepower.

An outlet conduit 15 leads from the fuel pump 12 to a heat exchanger 16 which preheats the methanol prior to introduction to a vapor generator 17. The methanol is heated to, for example, 280° F. while the fuel gases going to the internal combustion engine 14, as will be described, are cooled from 376° F. to 160° F.

The preheated liquid methanol is delivered to the vapor generator 17 where it is converted to a substantially saturated vapor at 300° F. The heat to vaporize the methanol in the vapor generator 17 is obtained from the exhaust gases from the internal combustion engine 14 which are cooled from, for example, 517° F. to 343° F. Gaseous methanol is conducted from the vapor generator 17 to a conventional catalytic reactor 18 where the vapor is further heated and partially decomposed by heat and contact with the catalyst. The products of decomposition are fuel gases in the proportions of 61 percent $H_2$, 31 percent CO, 4 percent $(CH_3)_2O$, and 4 percent $H_2O$. The fuel gases leave the catalytic reactor 18 at 800° F. and 200 psia after having absorbed heat from the exhaust gases of the internal combustion engine 14. The exhaust gases exit the exhaust manifold 19 at 1100° F. and are cooled in the reactor 18 to 517° F. at which temperature they enter the vapor generator 17, as discussed supra.

The fuel gases are conducted from the catalytic reactor 18 to an expander 20 which, in the embodiment of FIG. 1, is a turbine whose output is mechanically connected to the internal combustion engine 14 through a gear box 21. The expander 20 will thus aid in driving an output shaft 22 of the engine 14. In a typical installation, a fuel gas flow of 0.25 lbs/second through the fuel gas expander 20 will produce 95 horsepower while the internal combustion engine 14 produces 1030 horsepower for a total of 1125 horsepower.

Fuel gases leaving the expander 20 are at relatively low temperature and pressure, for example, 376° F. and 15 psia. These fuel gases are delivered to the charge cooler 16, where they are cooled to 160° F. from whence they are conducted to the carburetor 23 of the internal combustion engine 14 to be mixed with air and used to drive the engine 14.

Figure 2:
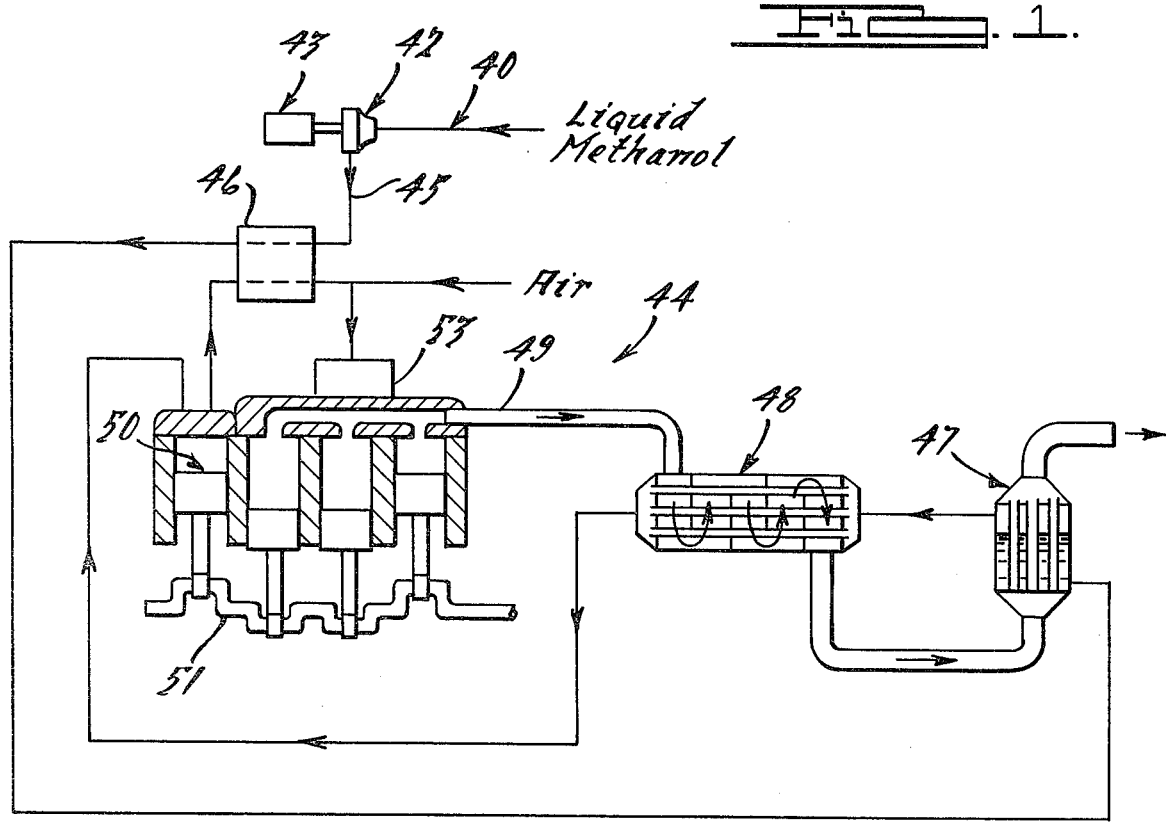
FIG. 2 is a view, similar to FIG. 1, of another embodiment of the invention.

Referring to FIG. 2 of the drawings, a second embodiment of the instant invention comprises a methanol supply line 40 which conducts liquid methanol to a fuel pump 42. The fuel pump 42 may be driven by a separate electric motor 43 or may be directly driven by a piston-type internal combustion engine generally indicated at 44.

An outlet conduit 45 leads from the fuel pump 42 to a heat exchanger 46 which preheats the methanol prior to introduction to a vapor generator 47. The methanol is heated to, for example, 280° F. while the fuel gases going to the internal combustion engine 44 are cooled from 376° F. to 160° F.

The preheated liquid methanol is delivered to the vapor generator 47 where it is converted to a substantially saturated vapor at 300° F. The heat to vaporize the methanol in the vapor generator 47 is obtained from the exhaust gases from the internal combustion engine 44 which are cooled from, for example, 517° F. to 343° F. Gaseous methanol is conducted from the vapor generator 47 to a conventional catalytic reactor 48 where the vapor is further heated and partially decomposed by heat and contact with the catalyst. The products of decomposition are fuel gases in the proportions of 61 percent $H_2$, 31 percent CO, 4 percent $(CH_3)_2O$, and 4 percent $H_2O$. The fuel gases leave the catalytic reactor 48 at 800° F. and 200 psia after having absorbed heat from the exhaust gases of the internal combustion engine 44. The exhaust gases exit the exhaust manifold 49 at 1100° F. and are cooled in the reactor 48 to 517° F. at which temperature they enter the vapor generator 47, as discussed supra.

The fuel gases are conducted from the catalytic reactor 48 to an expander 50 which is of the displacement type and whose output is mechanically connected to a crankshaft 51 of the internal combustion engine 44. The expander 50 thus aids in driving the crankshaft 51 of the engine 44.

While the preferred embodiment of the invention has been disclosed, it should be appreciated that the invention is susceptible of modification without departing from the scope of the following claims.

I claim:

1. A methanol fueled spark ignition engine comprising, a liquid methanol supply line, a liquid methanol fuel pump in said line for pressurizing the methanol therein, a heat exchanger having a liquid fuel inlet connected to the outlet from said pump and a liquid fuel outlet, a vapor generator having a liquid fuel inlet connected to the fuel outlet of said heat exchanger and a vapor outlet, a catalytic reactor for decomposing methanol vapor to hydrogen and carbon monoxide having a methanol vapor inlet connected to the outlet of said vapor generator and a decomposed methanol vapor outlet, an expander connected to the outlet of said catalytic reactor, a spark ignition engine having an output shaft and an exhaust system, said exhaust system leading from said spark ignition engine to said catalytic reactor thence to said vapor generator whereby liquid methanol leaving said heat exchanger will be further heated and vaporized in said vapor generator and additionally heated and decomposed in said catalytic reactor to form hydrogen and carbon dioxide, a carburetor for said spark ignition engine having an inlet for the induction of air and decomposed methanol vapor and a conduit leading from the outlet of said expander to said heat exchanger thence to the inlet of said carburetor whereby air will be mixed with said hydrogen and carbon dioxide for induction into said spark ignition engine to support combustion therein, said expander having an output shaft coupled to the output shaft of said spark ignition engine.

* * * * *